Figure 8:
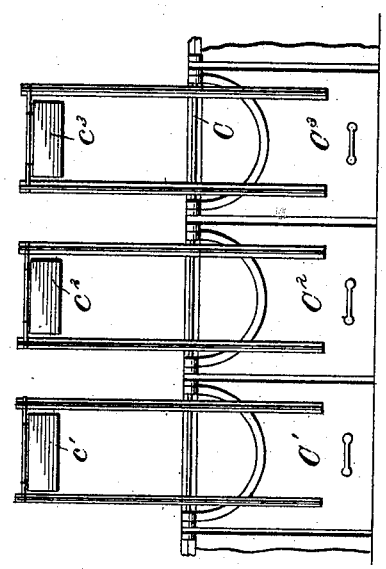

No. 693,359. Patented Feb. 18, 1902.
J. W. AREGOOD.
BRICK DRIER.
(Application filed Sept. 3, 1901.)
(No Model.) 6 Sheets—Sheet 1.

Witnesses:
H. S. Gaither
Geo. L. Wilkinson

Inventor:
John W. Aregood
By Miller & Chamberlin
Attorney.

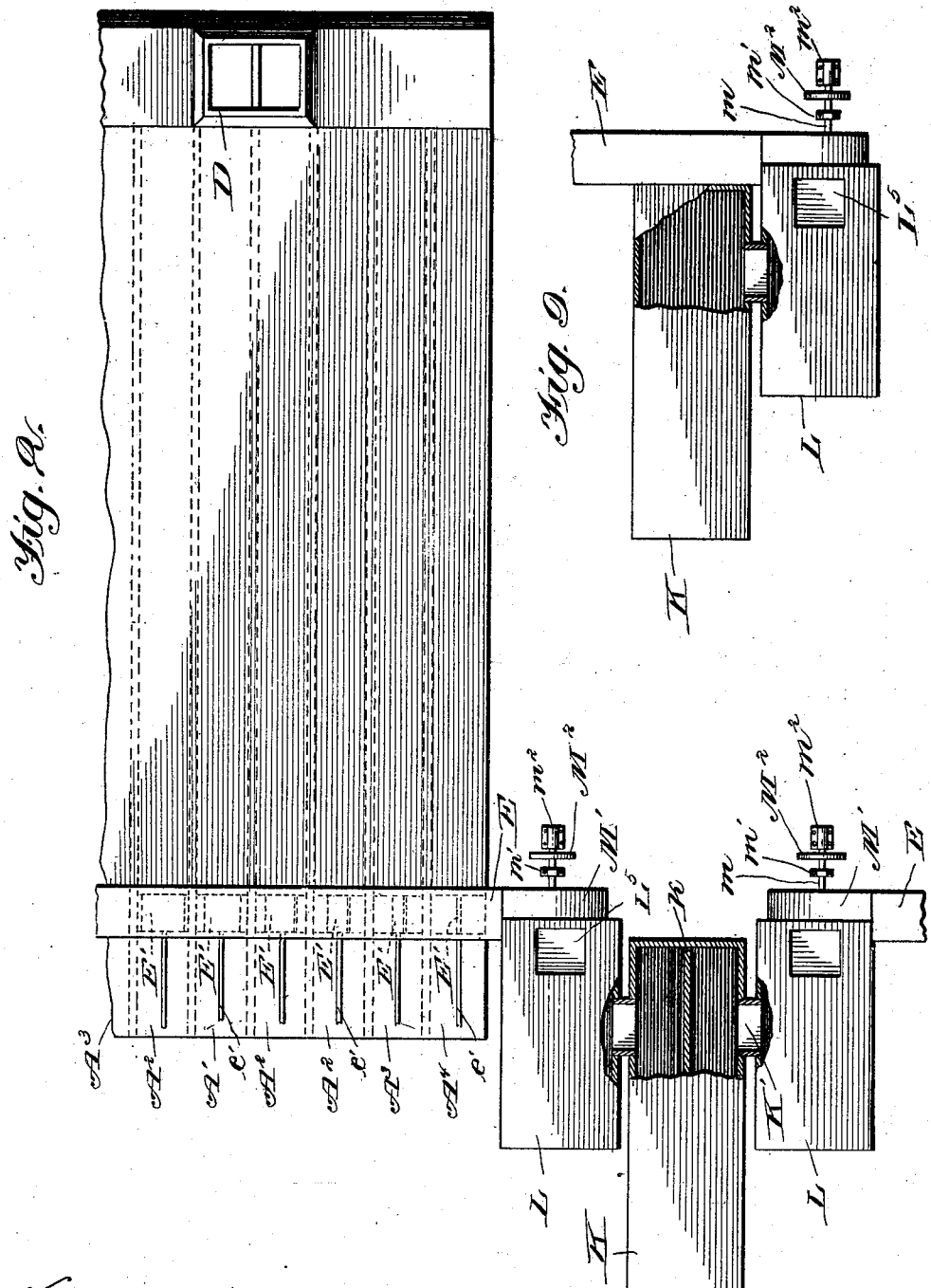

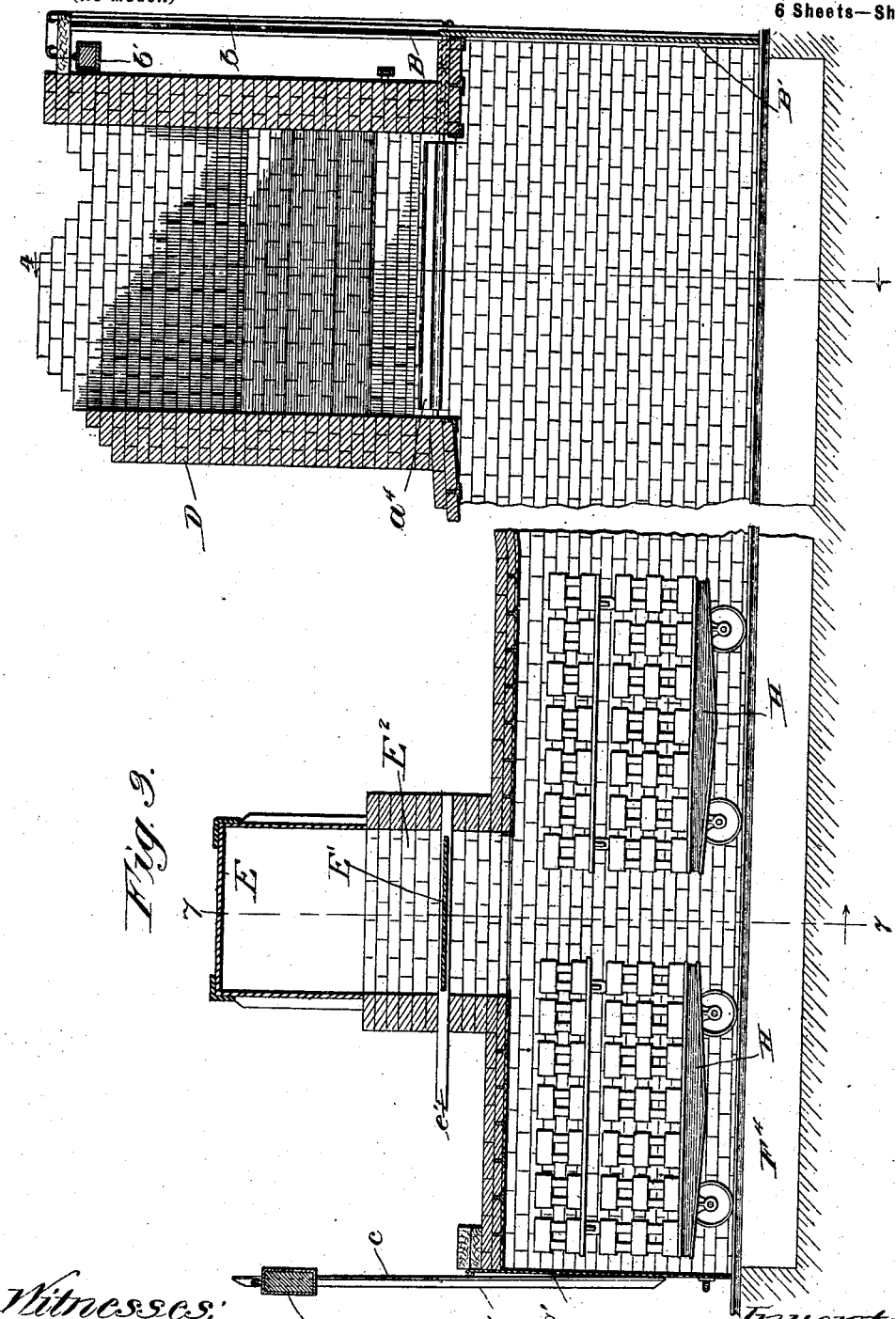

No. 693,359. Patented Feb. 18, 1902.
J. W. AREGOOD.
BRICK DRIER.
(Application filed Sept. 3, 1901.)
(No Model.) 6 Sheets—Sheet 4.
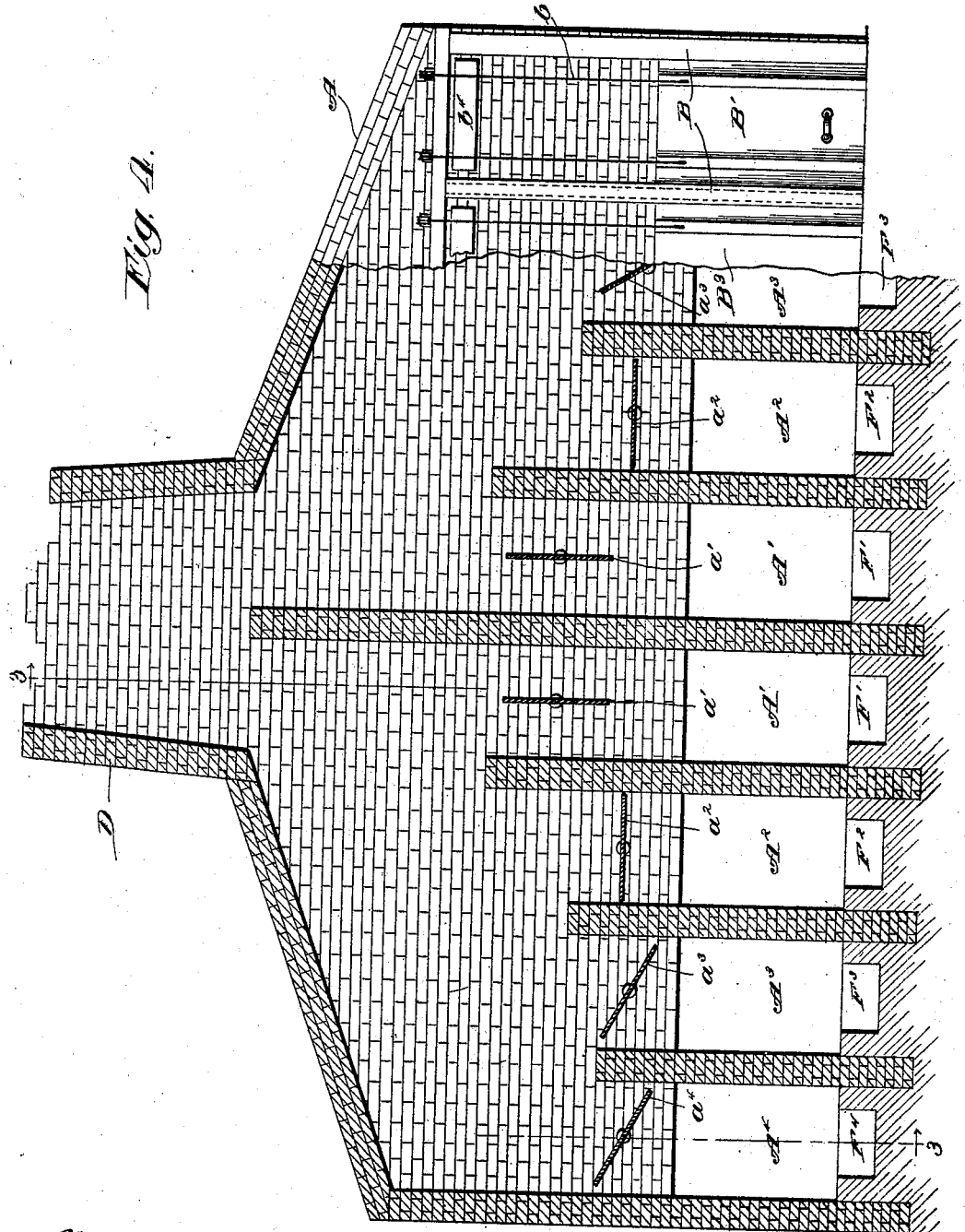
Witnesses: H. S. Gaither. Geo. L. Wilkinson.
Inventor: John W. Aregood by Walter H. Chamberlin Attorney.

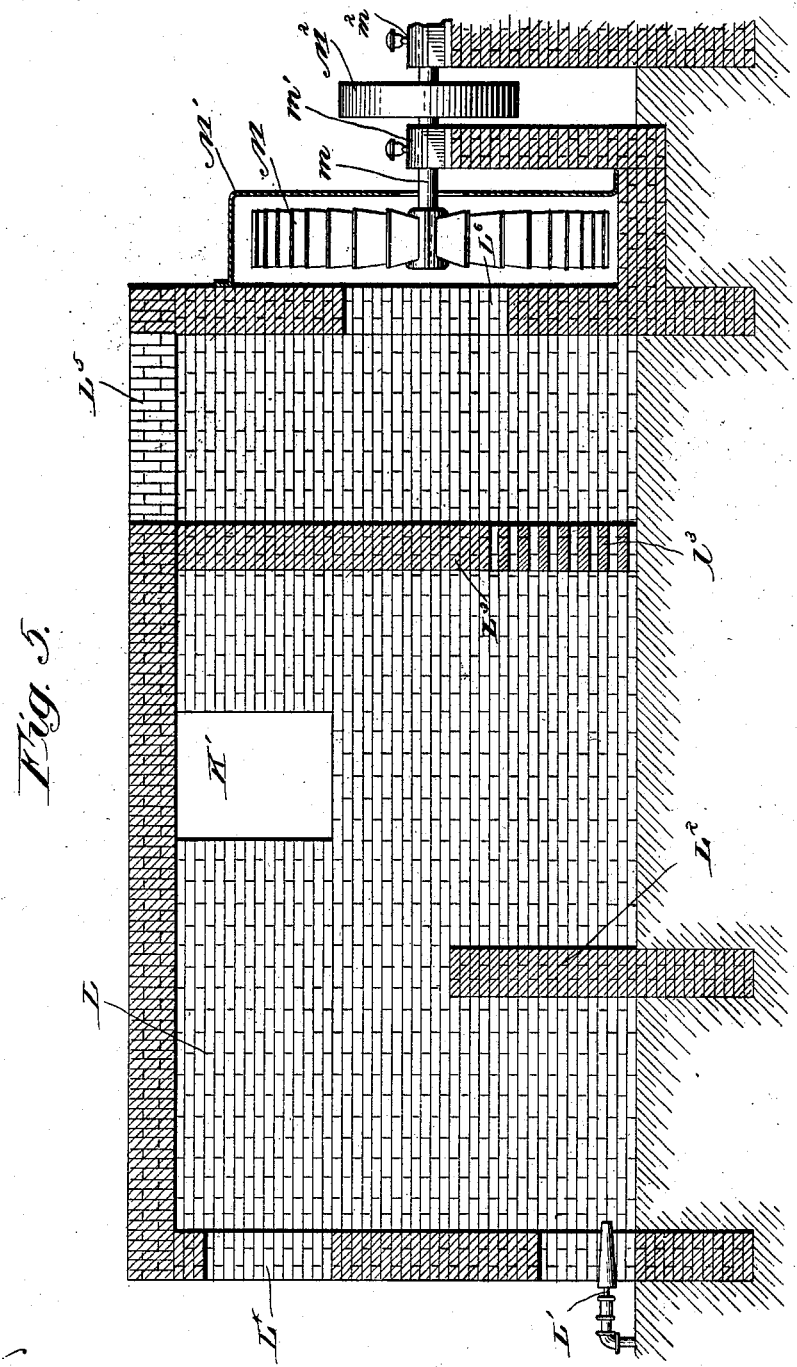

No. 693,359. Patented Feb. 18, 1902.
J. W. AREGOOD.
BRICK DRIER.
(Application filed Sept. 3, 1901.)
(No Model.) 6 Sheets—Sheet 6.
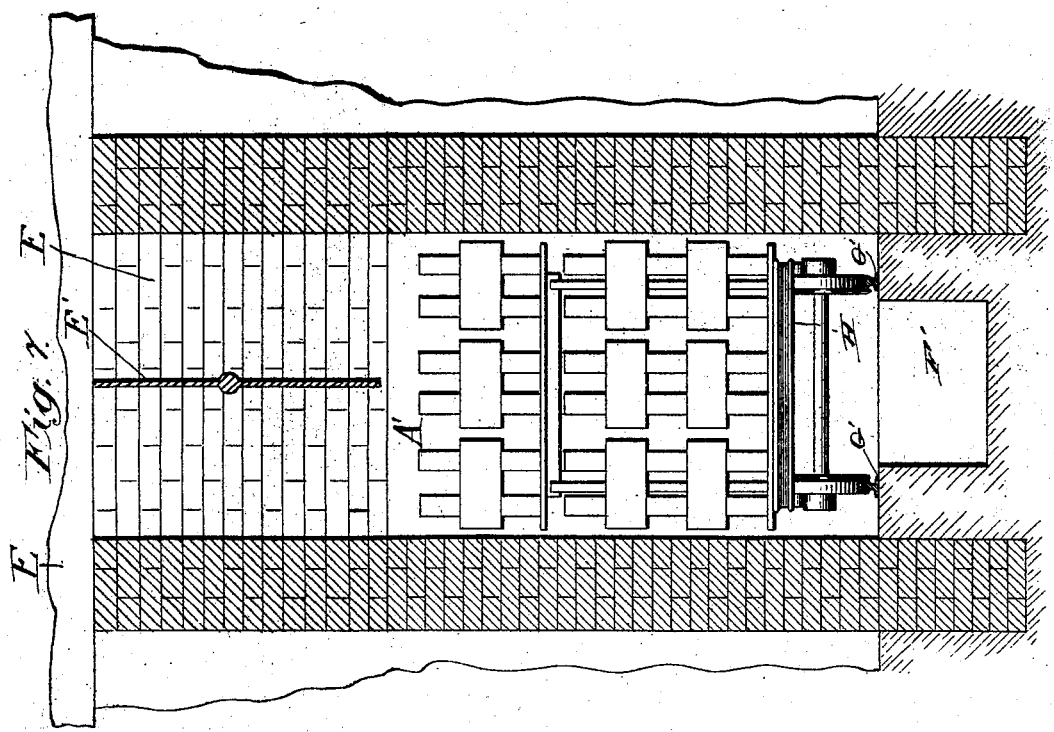
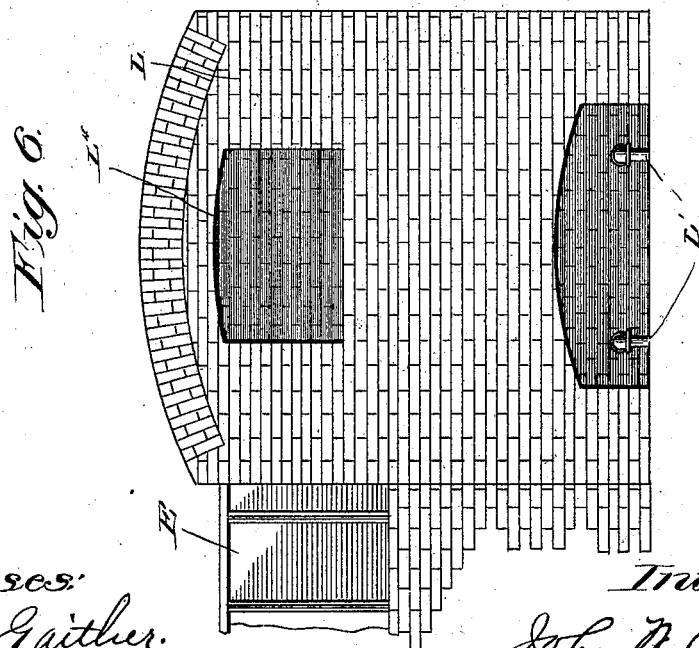
Witnesses: H. S. Gaither. Geo. L. Hilkman.
Inventor: John W. Aregood by Walter N. Chamberlin Attorney.

UNITED STATES PATENT OFFICE.

JOHN W. AREGOOD, OF CHICAGO, ILLINOIS, ASSIGNOR OF ONE-HALF TO PATRICK J. SEXTON, OF CHICAGO, ILLINOIS.

BRICK-DRIER.

SPECIFICATION forming part of Letters Patent No. 693,359, dated February 18, 1902.

Application filed September 3, 1901. Serial No. 74,182. (No model.)

*To all whom it may concern:*

Be it known that I, JOHN W. AREGOOD, a citizen of the United States, residing at Chicago, county of Cook, State of Illinois, have invented a certain new and useful Improvement in Brick-Driers; and I declare the following to be a full, clear, and exact description of the invention, such as will enable others skilled in the art to which it pertains to make and use the same, reference being had to the accompanying drawings, which form a part of this specification.

My invention relates in general to apparatus employed in brick-making, and more particularly to apparatus in which the moisture is evaporated from green bricks preparatory to baking them in the kilns, such apparatus being commonly known as a "drier."

In the use of brick-driers the green bricks delivered from the molds are piled upon cars which are run on tracks into the drier. It is desirable that the temperature should be uniform throughout the drier in order that the bricks in all parts thereof may be subjected to the same degree of temperature, thereby gradually and evenly evaporating the moisture from the bricks in all portions of the drier at a minimum consumption of fuel.

The object of my invention is to produce an apparatus of the class referred to in which the hot air delivered from the furnace to the drier is so distributed as to circulate through every part thereof, thereby subjecting the bricks uniformly to the desired degree of temperature and also more fully utilize the heat than heretofore possible.

A further object of my invention is to provide a drier in which a plurality of furnaces are so connected to a common flue leading to the drier that either one or more of the furnaces may be utilized to supply the necessary hot air and products of combustion.

My invention will be more fully described hereinafter by reference to the accompanying drawings, in which the same is illustrated as embodied in a convenient and practical form, and in which—

Figure 1:

Figure 1 is a view in elevation of my invention; Fig. 2, a plan view showing the relative location of the furnaces and the drier; Fig. 3, a vertical sectional view taken on line 3 3 of Fig. 4 looking in the direction of the arrows; Fig. 4, a transverse section taken on line 4 4 of Fig. 3 looking in the direction of the arrows; Fig. 5, a vertical sectional view taken on line 5 5 of Fig. 2; Fig. 6, an elevational view of one furnace, the adjacent furnace being shown broken away; Fig. 7, a transverse vertical section on line 7 7 of Fig. 3; Fig. 8, a front elevation of part of the drier, showing the counterbalanced doors; and Fig. 9 a plan view of a modified arrangement of the furnaces.

Similar reference characters are used to indicate similar parts in the several figures of the drawings.

My invention embodied in the form illustrated consists, essentially, in a plurality of furnaces which are connected to a flue, the latter communicating with each of a number of tunnels within which cars loaded with green bricks are placed. The communication of the flue with the several tunnels is regulated by dampers, and the communication of each tunnel with the chimney is also regulated by a series of dampers, whereby the supply of hot air to the several tunnels may be so regulated as to uniformly heat all of the tunnels, the draft from each tunnel being likewise regulated by a damper, so as to secure uniformity regardless of the fact that the tunnels are located at various distances from the chimney.

Referring more in detail to the figures of the drawings, reference-letter A indicates the drier proper, which is divided by partitions into a series of compartments or tunnels A', $A^2$, $A^3$, and $A^4$. Each of the tunnels is provided with a damper $a'$ $a^2$ $a^3$ $a^4$, controlling the communication with a chimney D, which is located near the rear end of the drier and communicates with each of the tunnels therein. Doors B', $B^2$, $B^3$, and $B^4$ close the rear ends of the tunnels and are shown as consisting in vertically-sliding doors having counterbalances $b'$, $b^2$, $b^3$, and $b^4$, connected thereto by any suitable means—as, for instance, by flexible cords passing over guide-pulleys located above the frames B, in which the doors are guided. The front ends of the tunnels are provided with doors C', $C^2$, $C^3$, and $C^4$, which may be of any suitable form, they, for convenience, being shown as swinging upwardly about pivotal supports C. Each of the doors is provided with a pair of extensions $c$, at the upper ends of which are located weights $c'$, $c^2$, $c^3$, and $c^4$, whereby the weight of each door is counterbalanced. A flue E, of any desired construction, communicates with each of the tunnels near its forward end, such flue in the present instance being shown as rectangular in cross-section and located above the tunnels with which it communicates through openings controlled by suitable dampers E'. These dampers are preferably rotatable and are provided with rods $e'$, extending to the front of the tunnels, where they may be conveniently operated to rotate the dampers to their open or closed positions. The flue E is supported above the tunnels by walls, which form passage-ways $E^2$, interposed between each tunnel and the flue E, in each of which is rotatably mounted a damper E'. By this arrangement the dampers may extend practically the entire width of the passages $E^2$, and when opened do not project either within the flue E, and thereby impede the passage therethrough of hot air, nor do they extend into the tunnels, where they would be liable to injury from contact with the loaded cars.

In Fig. 2 I have illustrated an arrangement of furnaces, in which one furnace K is adapted to burn coal, while the other L is provided with oil-burners L', which communicate with a supply of oil. The furnace L is provided with a bridge $L^2$, located in front of the oil-burners, and also with a bridge $L^3$, through which a number of openings $l^3$ are formed. The openings $L^4$ and $L^5$ supply the air to the furnace. A flue K' extends between the furnaces K and L and serves as the only means of communication between the coal-furnace K and the flue E. A fan M is located on the outside of the furnace L, being supported in any suitable manner, preferably, however, by means of a shaft $m$, having bearings $m'$ and $m^2$, mounted upon brick columns, as clearly shown in Fig. 5 of the drawings. By locating both of the bearings of the shaft $m$ outside of the furnace the injury thereto is avoided which would result from locating one of them on the side of the fan next to the furnace. Power is applied to the shaft $m$ and through it to the fan M by any suitable means—as, for instance, by a pulley $M^2$, around which a power-belt may pass, such belt being propelled by a steam-engine or other motor. A hood or cover M' surrounds the fan M and communicates with the end of the flue E. An opening $L^6$ is provided through the end wall of the furnace L opposite to the fan, through which the hot air and products of combustion are drawn by the fan and delivered to the flue.

Each of the tunnels A', &c., is provided with a pair of tracks G', &c., upon which cars H are run, such cars having been previously loaded with green bricks. Each of the tunnels A', &c., is provided with a passage-way F', &c., located between and below the tracks G', &c., thereby permitting the free circulation of the hot air under the cars H.

In Fig. 9 I have illustrated a modified arrangement of the furnaces, in which K indicates a coal-furnace which communicates through flues $K^2$ with supplemental furnaces, preferably for consuming oil, each of such supplemental furnaces being constructed substantially as illustrated in Fig. 5 and each communicating with a flue E through a fan or blower located in a casing M'. By this arrangement two separate and disconnected driers may be simultaneously supplied with hot air from a series of furnaces located at a given point. The coal-furnace K may, if desired, be provided with a longitudinal partition $k$, so as to form two parts thereof, as indicated in Fig. 2.

In Fig. 9 I have shown a modified arrangement of the furnaces, in which a single flue E is supplied with hot air and products of combustion from two furnaces—K adapted to burn coal and L for burning oil.

It has been found in practice that the tunnels farthest away from the furnaces receive the greatest quantity of hot air when the openings from the flue E to the several tunnels are the same in area. Consequently in order that each of the tunnels may receive the same quantity of hot air the dampers E' should be so adjusted that the opening from the flue E to the tunnel farthest from the furnaces is less than the openings between the flue and the other tunnels, the size of such openings gradually increasing toward the furnaces. In order that the draft through the chimney may be equally divided between the various tunnels, the dampers $a'$, $a^2$, $a^3$, and $a^4$ should be so adjusted that those regulating the communication between the chimney and the tunnels immediately below the same should be partially closed, while the dampers in the tunnels at each side of those in the center should be slightly more open, the degree of opening of the dampers increasing in the tunnels arranged on either side of the center.

The operation of my improved drier is as follows: The blower M draws the hot air and products of combustion through the opening $L^6$ in the furnace L, such hot air and products of combustion being supplied either by the furnace L alone or by the furnace K alone, the latter communicating through the flue K' with the furnace L and thence with the blower, or by both furnaces simultaneously. The blower forces the hot air through the flue E and thence into the several tunnels A', $A^2$, $A^3$, and $A^4$, the quantity supplied to each tunnel being practically the same, owing to the dampers E' having been so adjusted as to gradually diminish the size of the openings between the flue and the tunnels, commencing with the one nearest the furnaces. The hot air circulates around the cars in the several tunnels and through the bricks piled on the cars, the circulation being rendered uniform by so adjusting the dampers $a'$, $a^2$, $a^3$, and $a^4$ as to regulate the communication between the several tunnels and the chimney, according to the position of each tunnel with respect to the chimney. The cars H are rolled upon the tracks G', &c., through the doors B', &c., into the several tunnels at the rear end of the drier. When the bricks have been dried sufficiently, the cars are rolled out of the front ends of the tunnels by swinging the doors C', &c., about their pivotal supports C. Whenever a car is removed from a tunnel, the remaining cars are moved forward and a car with a fresh supply of bricks is inserted at the rear end, whereby the cars may be progressively removed from and inserted into the several tunnels.

From the foregoing description it is evident that I have produced a drier in which one or more furnaces may be utilized to supply the necessary heat, such heat being uniformly distributed to the various tunnels in the drier regardless of the distance between each tunnel and the furnaces and regardless of the relative distances between the various tunnels and the chimney. It should be noted that by the arrangement of dampers between the various tunnels and the hot-air flue and between the various tunnels and the chimney the heat is uniformly distributed throughout the drier, thereby avoiding heating portions of the drier too hot, while other portions are insufficiently supplied with heat, and consequently fully utilizing the heat generated and minimizing the consumption of fuel.

While I have shown the drier to comprise eight tunnels, I do not wish to limit myself to any particular number, as obviously my invention is applicable to a drier without regard to the number of tunnels comprised in such drier. It is also obvious that my invention may be used for other purposes than that of drying bricks, and while I have shown and described it as designed for the purpose of drying bricks I do not wish to be limited thereto, as I contemplate using it for drying other articles than bricks.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having fully described my invention, what I claim as new, and desire to secure by Letters Patent, is—

1. In an apparatus of the character described, the combination with a plurality of tunnels, of a flue extending transversely across the tops of said tunnels near one end thereof, passage-ways interposed between said tunnels and said flue the walls of said passage-ways supporting the flue above the tunnels, rotary dampers located entirely within and controlling the passage-ways between the bottom of said flue and the tops of each of said tunnels, a chimney surmounting and communicating with said tunnels near the ends thereof opposite said flue, and means for supplying hot air to said flue, substantially as described.

2. In an apparatus of the character described, the combination with a plurality of tunnels, of outwardly-swinging doors closing the front ends of said tunnels, a flue extending transversely across the tops of said tunnels near the front ends thereof, passage-ways interposed between each of said tunnels and said flue the walls of said passage-ways supporting the flue above the tunnels, rotary dampers located entirely within and controlling the passages between the bottom of said flue and tops of each of said tunnels, a chimney surmounting and communicating with said tunnels near the rear ends thereof, a damper controlling the communication between the chimney and each tunnel, vertically-sliding doors closing the rear ends of said tunnels, and means for supplying hot air to said flue, substantially as described.

3. In an apparatus of the character described, the combination with a plurality of tunnels, of a flue extending transversely across the tops of said tunnels, passage-ways interposed between each of said tunnels and said flue the walls of said passage-ways supporting the flue above the tunnels, rotary dampers horizontally located within said passage-ways and controlling the communication between said flue and each of said tunnels, a chimney communicating with said tunnels near the ends thereof opposite said flue, a damper controlling the communication between the chimney and each tunnel, and means for supplying hot air to said flue, substantially as described.

4. In an apparatus of the character described, the combination with a plurality of tunnels, of a flue communicating with said tunnels, a damper controlling the communication between the flue and each tunnel, a chimney communicating with the tunnels, a furnace having a fire-box at one end and an opening through the other end communicating directly with said flue, a blower located in alinement with said flue and adjacent to said opening and adapted to rotate in a plane transverse to the furnace and longitudinal with respect to the flue, substantially as described.

5. In an apparatus of the character described, the combination with a plurality of tunnels, of doors closing the front and rear ends of each of said tunnels, a flue communicating with said tunnels, a damper controlling the communication between said flue and each of said tunnels, a chimney communicating with said tunnels a damper controlling the communication between said chimney and each of said tunnels, tracks extending through each tunnel, passage-ways located below and between the tracks in each tunnel, a furnace having a fire-box at one end and an opening through the other end communicating directly with said flue, and a blower located adjacent to said opening and in alinement with said flue said blower adapted to rotate in a plane transverse to the furnace and longitudinal with respect to the flue, substantially as described.

6. In an apparatus of the character described, the combination with a plurality of tunnels, of outwardly-swinging doors closing the front ends of said tunnels, a flue extending transversely across the tops of said tunnels near the front ends thereof, dampers controlling passages between the bottom of said flue and tops of each of said tunnels, a chimney surmounting and communicating with said tunnels near the rear ends thereof, a damper controlling the communication between the chimney and each tunnel, vertically-sliding doors closing the rear ends of said tunnels, a furnace having a fire-box at one end and an opening through the other end communicating directly with said flue, and a blower located adjacent to said opening and in alinement with said flue said blower adapted to rotate in a plane transverse to the furnace and longitudinal with respect to the flue, substantially as described.

7. In an apparatus of the character described, the combination with a drier, of a flue communicating with said drier, a furnace having a fire-box at one end and an opening through the other end communicating directly with said flue, a blower located adjacent to said opening and in alinement with said flue and adapted to rotate in a plane transverse to the furnace and longitudinal with respect to the flue, and a second furnace adjacent to and parallel with the first furnace and communicating therewith at a point intermediate of its ends whereby said blower may deliver hot air to said flue from either of said furnaces, substantially as described.

8. In an apparatus of the character described, the combination with a drier, of a flue communicating with said drier, a furnace having oil-burners at one end and an opening at its other end communicating with said flue, a blower interposed between said furnace and said flue, and a second furnace adapted to consume coal communicating with said first furnace between its ends whereby said blower may deliver hot air to said flue from either of said furnaces, substantially as described.

9. In an apparatus of the character described, the combination with a drier, of a flue communicating with said drier, a furnace having an opening communicating with said flue, a blower located outside of said furnace and adjacent to said opening and adapted to draw hot air from said furnace and force the same into said flue, a shaft supporting at one end said blower and being supported by bearings located on the opposite side of said blower from said furnace, substantially as described.

10. In an apparatus of the character described, the combination with a main furnace, auxiliary furnaces adjacent to and on either side of said main furnace and communicating therewith at points intermediate of the ends of said auxiliary furnaces, flues connected to each of said auxiliary furnaces, blowers located between said flues and said auxiliary furnaces, and driers connected to said flues whereby said blowers may deliver hot air to said driers from said main furnace or said auxiliary furnaces, substantially as described.

In testimony whereof I sign this specification in the presence of two witnesses.

JOHN W. AREGOOD.

Witnesses:
FRANK JOBIN,
NELS JOHNSEN.